United States Patent [19]

Numakura et al.

[11] Patent Number: 4,956,718

[45] Date of Patent: Sep. 11, 1990

[54] TONAL CONVERSION METHOD FOR PICTURES

[75] Inventors: Takashi Numakura, Tokyo; Susumu Kitazawa, Kanagawa; Junichi Naya, Miyagi; Iwao Numakura, Tokyo, all of Japan

[73] Assignee: Yamatoya & Co., Ltd., Tokyo, Japan

[21] Appl. No.: 390,910

[22] Filed: Aug. 8, 1989

[30] Foreign Application Priority Data

Aug. 23, 1988 [JP] Japan ................................. 63-207326

[51] Int. Cl.$^5$ .............................................. H04N 1/23
[52] U.S. Cl. ...................................... 358/298; 358/456
[58] Field of Search ............... 358/298, 456, 455, 458, 358/461, 302

[56] References Cited

U.S. PATENT DOCUMENTS 4,811,108 3/1989 Numakura .......................... 358/456
4,833,546 5/1989 Numakura .......................... 358/456

Primary Examiner—Bruce A. Reynolds
Assistant Examiner—Scott A. Rogers
Attorney, Agent, or Firm—Wenderoth, Lind & Ponack

[57] ABSTRACT

An original picture having a standard or non-standard picture quality is converted into a halftone picture, which is to be reproduced, on basis of pictorial information. The density information on the individual density characteristic curve is adjusted to the density information on the standard density characteristic curve. The adjusted density information is then processed in such a way that the base density of a desired control point on the original picture and the halftone intensity of a corresponding control point on the halftone picture are correlated in accordance with a specific conversion formula.

6 Claims, 6 Drawing Sheets

Basic Density Characteristic Curve of Color Film

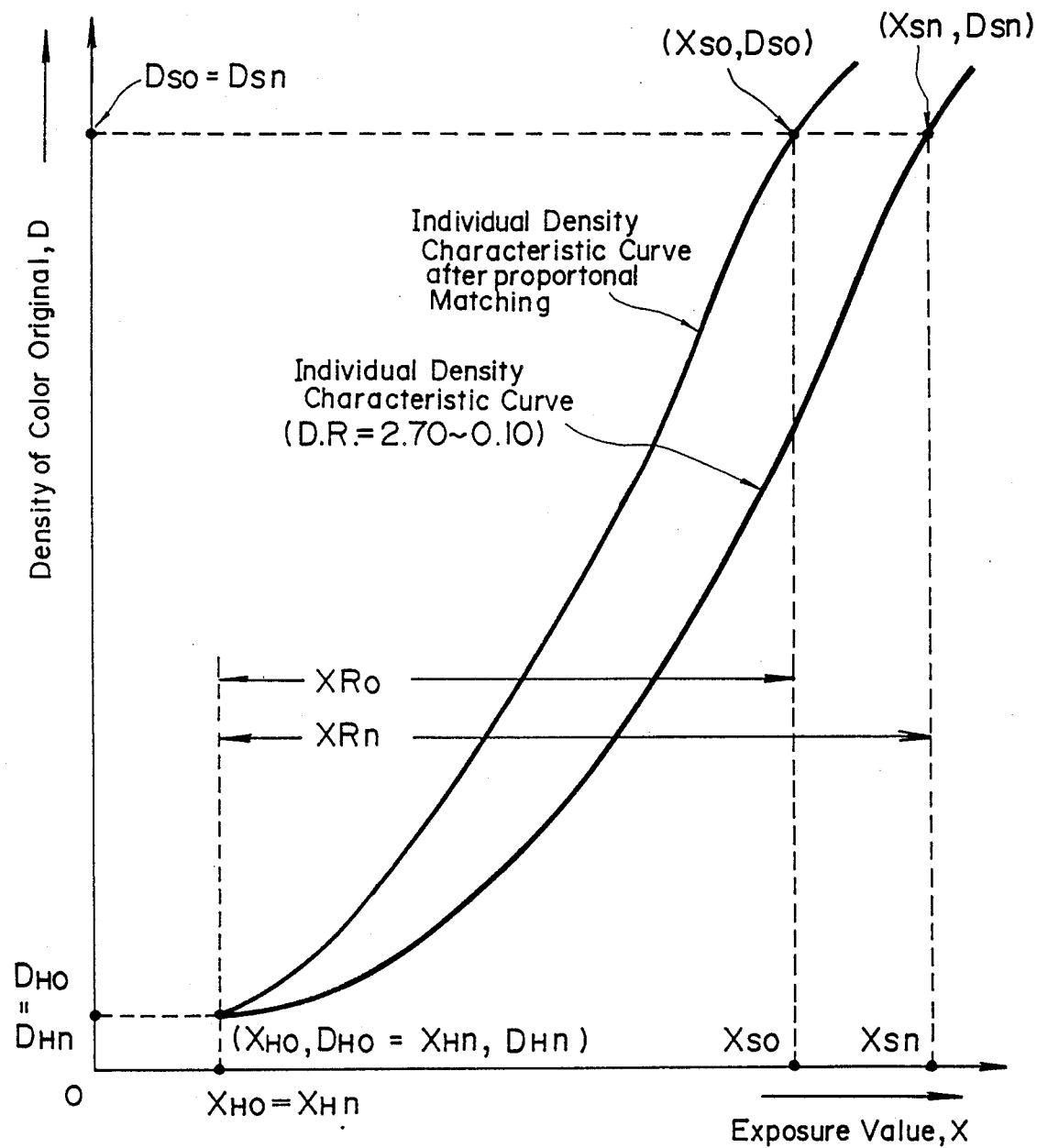

TONAL CONVERSION METHOD FOR PICTURES

FIELD OF THE INVENTION

This invention relates to a novel tonal conversion technique in the density range of a picture useful upon production of hard pictures such as printed pictures and soft pictures such as CRT (video) pictures (transient images displayed optically) [which will hereinafter be called "reproduced pictures" collectively] from original pictures such as paintings, monochrome pictures, color pictures, or picture information stored in a camera tube or CCD, to a novel method for production a reproduced picture from the original picture.

More specifically, the present invention relates to a tonal conversion technique of a picture upon producing a reproduced picture from an original picture, in which a density characteristic (hereinafter called as "a picture quality") in the density range of the original with a standard or non-standard picture quality, is converted into a density characteristic of a standard picture quality, then the adjusted density information data are processed in accordance with a novel tonal conversion formula whereby a desired reproduced picture is stably obtained at any time.

BACKGROUND OF THE INVENTION

It is the present state of art that no basic technique has yet been established to permit conversion of an original into a reproduced picture with good reproducibility in gradation and tone (hereinafter called "picture quality") or with a desired picture quality in the tonal conversion of the original picture for the production of the reproduced picture from the original picture.

In other words, in the production of the reproduced picture with a good or desired picture quality from the original picture, the "non-line drawing conversion technique in the density range of a picture" which may be considered to form a basis for the reproduction is dependent totally on experiences and perception of an operator and is thus non-scientific and non-rational.

The term "non-line drawing conversion technique in the density range of the picture" (hereinafter called the "conversion technique in the density range of the picture" or merely the "tonal conversion technique of the picture") means a technique which is fundamentally different in field from image processing in the spatial range, image processing in the spatial frequency range, image processing of a given picture by a statistical method, and processing techniques for pictorial characteristics of a given picture such as pattern analyses. It rather provides a basic technique for these image processing technology.

Because, it is the crux, basis and fundamental of the tonal conversion of a picture upon production of a reproduced picture that irrespective of the characteristics of the original picture and irrespective of the technical details or means therefor, the picture quality of the original picture be converted at the ratio of 1:1 and the picture quality of the resultant reproduced picture has a suitable density gradient whereby the reproduced picture is felt natural to the visual sensation of man.

However, the present conversion techniques in the density range of a picture (tonal conversion techniques for pictures) are totally dependent on the experiences and perception of man. Moreover, no attempt has been made to improve these techniques to rational and scientific ones. Accordingly, conventional machines, equipment and components for obtaining reproduced pictures on the basis of any of such conventional tonal conversion techniques for pictures as well as conventional systems using in combination two or more of such conventional machines, equipment and components cannot provide reproduced pictures with good reproduction of the picture quality of original pictures. In addition, their constructions are unnecessarily complex and sophisticated, leading to problems in manufacturing costs, ease and convenience in use, repair, maintenance, etc.

These problems can be attributed primarily to the fact that no tonal conversion technique for a picture, which permits scientific and rational reproduction of the picture quality of the original picture at the ratio of 1:1 in a reproduced picture, has yet been established as the above-mentioned basic technique in the conversion technology for pictures.

When consideration is made in actual technique such as reproduction from a color film original as an original a printed picture as a reproduced picture, there is no ideal to rationally grasp the density characteristics raged from the highlight to the shadow of the original picture. Upon production of a printed picture, the continuous tone of an original picture has to be converted into halftone for the printed picture by setting a color-separation characteristic curve or a halftone characteristic curve. The above technique is totally dependent on experiences and perception of the operator.

For the above reason, there exist problems relating to a tonal conversion of a picture, such as a problem relating to the color separation of an original color film with a non-standard quality upon production of a printed picture, a problem relating to soft and hard wares in digital picture processing systems such as a color duplicating machine, which becomes complicated in consequence of expansion of their function, a problem relating to limitation of performance of an exposure light quantity controlling mechanism in printing of a photographic picture, a problem relating to measures counter to sophistication of picture quality control function for a luminous picture such as television pictures, a problem relating to production of binary pictures, halftones, or multivalued pictures with a smooth tone by way of a systematic process in laser printers, ink jet printers, thermal printer, etc., a problem relating to overcoming limitations of photographing time and photographing system in a low illuminance area, a problem relating to simplification of mechanism used in various detection and control apparatus applied picture images, a problem relating to reducing quantity of picture information to be transmitted, a problem relating to simplification of a mechanism in general picture processing systems, improvement of performance of such systems, and reduction of manufacturing cost thereof. These problems arise fundamentally from the fact that the density characteristic of a picture ranged from the highlight area to the shadow area is not rationally grasped and there has not been obtained scientific and rational means or method for correlating an original picture with its reproduced picture. It is therefore totally depending on experiences and perception of man.

OBJECT AND SUMMARY OF THE INVENTION

The present inventors has had the basic recognition that as the problem common to all conventional techniques for the conversion processing technique in the density range of an original upon production of a reproduced picture from the original picture, the density characteristics ranged from the highlight area to the shadow area of an original such as a photographic original upon producing a printed picture as a reproduced picture are not rationally grasped so that the means or method for correlating an original picture with its reproduced picture, which forms basis of a tonal conversion process of a picture, is totally dependent on the experiences and perception of man.

Under such basic recognition, the present inventors have already made proposals for correlating tonal characteristics of an original picture with that of its reproduced picture by using specific tonal conversion formula, whereby the tonal conversion technique in the density area of a picture becomes scientific and rational (see U.S. patent application Ser. No. 166,101; European Patent Application No. 88 302 094.3 of Publication No. 0 282 305).

From the result of research conducted thereafter by the present inventors, it was found that the tonal conversion techniques proposed by the present inventors by using the specific tonal conversion formula are extremely effective when a color film original with a standard picture quality is color-separated by a scanner for making a plate or when such an original picture is processed by a picture processor for producing a reproduced picture. However, it has also been found that it cannot rationally cope with a color film original having a non-standard picture quality upon conducting tonal conversion. Namely, further experiments are necessary with use of the tonal conversion formula previously proposed by the present inventors in order to produce a reproduced picture with a desired picture quality from an original with a non-standard picture quality.

An object of the present invention is therefore to provide a tonal conversion method of a picture upon producing of a reproduced picture from an original, which permits to provide a reproduced picture with a desired and good picture quality constantly and steadily, irrespective of the picture quality of the original, standard or non-standard, in the density range of the original.

In summary, this invention relates to a method for producing a reproduced picture by tonal conversion of an original picture on the basis of pictorial information from the original picture, which comprises:

(i) setting the density value ($H_n$) of the highlight area of the original picture, the density value ($S_n$) of the shadow area of the original picture and an individual density characteristic curve $fD_n(x)$ ranging from said $H_n$ to said $S_n$, in which x indicates a physical value correlated to the densities (D) of the original picture and reproduced picture, such as exposure;

(ii) setting the density value ($H_o$) of the highlight area and the density value ($S_o$) of the shadow area of a standard original picture, which can provide a reproduced picture having suitable picture quality for the visual feeling of men, as well as a standard density characteristic curve $fD_o(x)$ ranging from said $H_\phi$ to said $S_\phi$;

(iii) adjusting the individual density characteristic curve $fD_n(x)$ to the standard density characteristic curve $fD_o(x)$ and further determining an adjusted density information value $D_o$ on the standard original picture corresponding to the density information value $D_n$ of a desired picture element on the original picture; and (iv) then conducting tonal conversion of the picture in said density range on the basis of the thus-obtained adjusted density information value $D_\phi$ on the standard original picture corresponding to the density information value $D_n$ of the desired picture element on the original picture by using the following tonal conversion formula:

$$y = y_H + \frac{\alpha[1 - 10^{-k \cdot (D_o - H_o)}]}{\alpha - \beta} \cdot (y_S - y_H)$$

where
- ($D_o - H_o$): the base density information datum obtained by subtracting the density value $H_o$ of the highlight area of the standard original picture from the adjusted density information value $D_o$ on the standard original picture corresponding to the density information value $D_n$ of the desired picture element on the original picture;
- y: the halftone density intensity on the reproduced picture, corresponding to the desired picture element on the original picture;
- $y_H$: a desired halftone density intensity set for the highlight area on the picture to be reproduced;
- $y_S$: a desired halftone density intensity set for the shadow area on the picture to be reproduced;
- $\alpha$: the surface reflectance of a base material on which the reproduced picture is to be shown;
- $\beta$: a value obtained from $\beta = 10^{-\gamma}$;
- $\kappa$: another value determined from $\gamma/(S_o - H_o)$; and
- $\gamma$: a desired optional factor.

BRIEF DESCRIPTION OF THE DRAWINGS

FIG. 4(b) is a diagrammatic illustration showing an example in which the individual density characteristic curve is matched with the standard density characteristic curve according to a proportional matching.

DETAILED DESCRIPTION OF THE INVENTION

Figure 1:
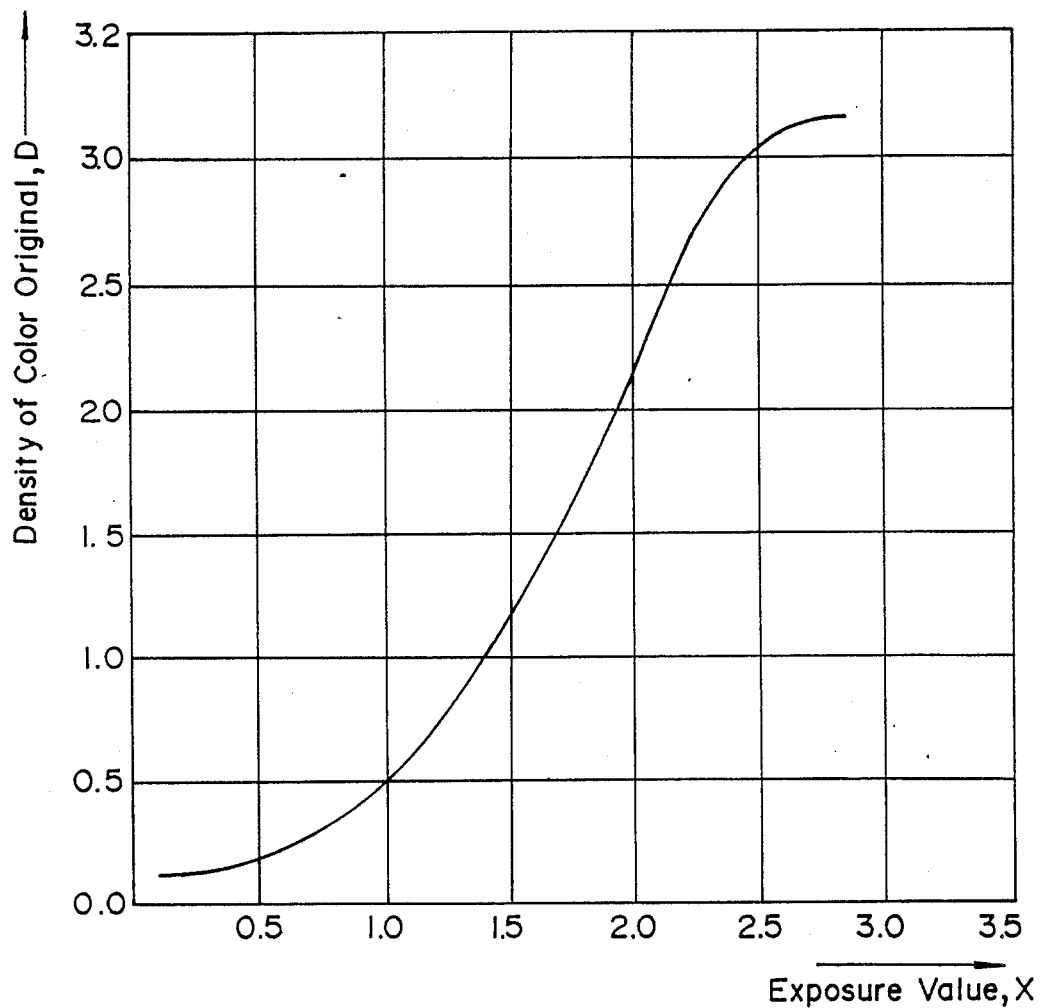
FIG. 1 is a graph showing a basic density characteristic curve of a color film.

Features of the present invention will hereinafter be described in detail.

(i) Developing process of the tonal conversion formula (1) of the present invention:

The developing process of the tonal conversion formula (1) of the present invention previously described will be first illustrated. The present inventors have already proposed a tonal conversion method suitable for use upon production of reproduced pictures such as printed pictures (U.S. patent application Ser. No. 166,101 now U.S. Pat. No. 4,811,108; European Patent Application No. 88 302 094.3 of Publication No. 0 282 305).

In the above applications, the present inventors have proposed to conduct tonal conversion work of a picture in accordance with a specific tonal conversion formula, the tonal conversion formula may scientifically and rationally determine the correlation between an original and a reproduced picture upon correlating the tonal characteristics of both pictures. It forms basis of said technique and eliminates the dependency on the experiences and perception of man from the tonal conversion technique for the picture.

The technical details of the present invention have been obtained by generalizing the tonal conversion technique proposed previously. Accordingly, the process which led to the development of the tonal conversion formula useful in the tonal conversion proposed previously is also believed to be useful for the better understanding of the technical details of the present invention.

To distinguish the formula (1) derived in this invention, the previously-proposed tonal conversion formula will hereinafter be called "the formula (2)". Further, as already described above, the previously-proposed formula (2) is useful not only in the formation of a picture to be printed but also in the formation of a picture to be recorded by any of various printers, copying machines and the like. For the sake of convenience, the process will be described referring to the formation of a picture to be printed by way of example.

It has been well known that upon production of a printed material, the conversion of the tone of an original picture from continuous tone to halftone is indispensable when a halftone picture is produced from an original picture such as a colorphotograph by a process camera or the like or the color separation work of a photographic color original is conducted by an electronic color separation apparatus (e.g., monochrome scanner or color scanner).

When conducting the tonal conversion, the following facts must be kept in mind.

In a printed picture with halftone, there are two basic elements expressing the density gradation of a printed picture, i.e., "dot areas" and "the reflection density of an ink". Regarding "the reflection density of the ink", it has been known emprically that in order to conduct printing while reproducing dots in a highlight area H and a shadow area S on a printing plate correctly on a sheet of printing paper, namely, in order to perform adequate printing, the amount of the ink must be controlled within about ±10% relative to an appropriate ink amount on a printing machine (in the case of a black plate, the amount of an ink may be controlled within a range as wide as about ±20% in some instances so as to improve the picture quality of the picture or black characters or letters.). It has also been recognized that the changing of the picture quality of the ink does not largely affect to the gradation and tone of the reproduced picture. From experiences, it has known that the visual sensation of man can easily distinguish a difference as small as 1% between "dot area" percentages as a density difference and the accuracy of the visual sensation is hence superior to densitometers. It has also been known empirically that the area at the same dot may vary by a degree as much as several tens percentages in a plate-making or printing operation. The ability of changing the picture quality (gradation and tone) of a printed picture by changing the amount of an ink at a desired group of dots (dot arrangement) is far smaller than the ability of changing the picture quality of the printed picture by changing the size of dots at a given ink coat weight. In view of these objective facts and emprical rules, it is readily understood that the control of the area of each dot is extremely important in the production of a printed picture as a halftone picture.

In relation to the matter mentioned above, photomechanical plate-making work involves the following background characteristics. Namely, original pictures have a wide variety of picture quality and details. The step for the formation of a printed picture, which follows the photomechanical plate-making work, is diversified and moreover, each of such diversified kinds of printed-picture forming steps has its own work characteristics. Base materials such as printing paper sheets and color materials such as printing inks, which are both used to express or visualize pictures to be printed, have various properties Furthermore, the picture quality evaluation standard for printed pictures varies from one orderer for prints to another.

In order to absorb and overcome such complex and unstable factors involved in the photomechanical plate making work and printing work, it is therefore essential to provide means for allowing to choose the smallest dot ($y_H$) at the highlight area and the largest dot ($y_S$) at the shadow area in a halftone picture to be produced (to be printed) as desired upon conversion of a continuous-tone picture into a halftone picture and further for allowing to rationally and easily set and control the tones of a picture, said tones ranging from the brightest area to the darkest area, to desired tones.

Based on the foregoing view, the present inventors theoretically derived the below-described tonal conversion formula (2) in such a manner that it conforms with the practice of plate-making work. Here, it is to be noted that the below-described formula (2) employed upon production of a printed picture may look at first glance similar to the tonal conversion formula (1) useful in this invention but important differences exist in the meanings or values of the individual terms. Leaving the description of these differences to a subsequent part, the process in which the formula (2) was derived will be described further.

Tonal Conversion Formula (2)

$$y = y_H + \frac{\alpha(1 - 10^{-kx})}{\alpha - \beta} \cdot (y_s - y_H)$$

where
 x: the base density of the desired control point on the original picture, namely, a value obtained by subtracting the density at the hightlight area of the original continuous-tone picture from the density at the desired control point of the original pictures,
 y: the halftone intensity of the corresponding control point on the picture to be reproduced,
 $y_H$: a desired halftone intensity set for the brightest area of the picture to be reproduced,
 $y_S$: a desired halftone intensity set for the darkest area of the picture to be reproduced,
 $\alpha$: the reflectance of a base material on which the halftone picture is to be reproduced,
 $\beta$: the surface reflectance of a medium for visualizing the halftone picture, and κ: the ratio of the density range of the halftone picture to be reproduced to the density range of the original picture.

The above-described conversion formula (2), which is useful in determining dot area percentages (y), was derived from the density formula (photographic density, optical density) accepted widely, namely, $$D = \log I_\phi/I = \log 1/T$$

where
- $I_\phi$: intensity of incident light,
- $I$: intensity of light reflected or transmitted, and
- $T = I/I_\phi$ = reflectance or transmittance.

The above general formula for the density D may be applied to plate-making and printing in the following manner.

Density ($D'$) in plate-making and printing $$\begin{aligned}
&= \log I_0/I \\
&= \log (\text{unit area} \times \text{reflectance of paper})/\{(\text{unit area} - \text{dot area}) \times \text{reflectance of paper} + \text{dot area} \times \text{surface reflectance of ink}\} \\
&= \log \alpha A/[\alpha\{A - (d_1 + d_2 + \ldots + d_n)\} + \beta(d_1 + d_2 + \ldots d_n)]
\end{aligned}$$

where
- A: the unit area,
- $d_n$: the area of each dot in the unit area,
- α: the reflectance of the printing paper, and
- β: the surface reflectance of the printing ink.

In the present invention, the density formula (D') for plate-making and printing was incorporated with the above-described requirement for the maintenance of correlation between the base density (x) at a desired control point on a continuous-tone picture and the dot area percentage (y) of the dot at the corresponding control point on a resulting halftone picture, whereby the tonal conversion formula (2) has been derived so as to bring a theoretical value into substantial conformity with its corresponding value measured actually.

When the formula (2) is applied to a tonal conversion method of a picture upon production of a printed picture, the above formula (2) is used to determine the value (y) of the dot area percentage of the dot at a control point (Y) on a picture, which is to be printed, from the base density information datum (x) of a corresponding control point (X) on an original picture while freely selecting the sizes ($y_H$, $y_S$) of dots desired to be placed in the highlight area H and shadow area S of the picture, which is to be printed, on the basis of the values of the reflectance (α) of a printing ink, and the ratio (κ) of the density range of the printed picture to the density range of the original picture.

It is accordingly possible to reproduce the density gradation of the original picture with fidelity at the ratio of 1:1 on the printed picture.

In the case of multicolor plate-making (the four plates, namely, cyan plate (C), magenta plate (M), yellow plate (Y) and black plate (BL) are generally considered to make up a unit), once the basic work characteristic curve of a base plate [in the case of multicolor plate-making, the cyan plate (C) serves as a base plate as known very well in the art], namely, the basic halftone characteristic curve for converting the density of an original picture into a halftone area percent of a printed picture is determined, the basic work characteristic curves of the other color plates can always be determined rationally by multiplying the value y of the base plate with appropriate adjustment values which are based respectively on the gray balance ratios of the corresponding individual printing inks. So long as the tonal conversion of a picture is conducted in accordance with the formula (2), the adjustment and control of the gradation and tone of a picture to be printed in accordance with a multicolor printing technique can be effected rationally.

The present inventors have already made the following proposal. By using the formula (2) obtained as described above, it is possible to get rid of the conventional tonal conversion method which relies upon experiences and perception, and hence to perform the tonal conversion of a picture as desired and in a rational manner. As a consequence, rational conversion is also feasible with respect to the tone which is related closely and unseparable to the gradation, and a printed picture having a density gradient and a tone natural to the visual sensation of a man can be obtained.

However, the existence of certain limitations to the actual use of the formula (2) was found in a subsequent investigation.

Namely, the formula cannot be applied satisfactorily where an original picture has non-standard picture quality, especially, extremely poor picture quality (for example, a color film original over- or under-exposed upon its photographying).

The present inventors has been proposed a method for defining the values of β and κ in the formula (2) by introducing the value of γ to effectively cope with such limitation (see Japanese Patent Application No. 63-114599). Accumulation of experiments are however required to determine the value γ, hence the method cannot be said fully satisfactory at this time. Accordingly, establishment of the tonal conversion technique of a picture in accordance with a tonal conversion formula in which the value γ is a constant is extremely important to automatic picture processing and reduction of the labor. Needless to say, in the tonal conversion technique of a picture freedom should be ensured so that a predetermined value as the γ value except for a constant value can be adopted when one wants to change the picture quality of a printed picture with intention (ii) Tonal conversion technique of a picture according to the tonal conversion formula (1) of this invention:

The feature of the tonal conversion technique of a picture by using the tonal conversion formula (1) of this invention will be summarized. The present invention allows to obtain constantly and stably a reproduced picture with a desired picture quality from an original by effectively coping with the picture quality of the original irrespective to the original picture quality, standard or non-standard.

Next will be described the features of the tonal conversion of the tonal conversion formula (2) illustrated in the part (i), which has been proposed by the present inventors.

(1) Tonal conversion of a picture may be rationally and systematically conducted when the density characteristic curve of an original picture, which is a curve showing a correlation between a physical quantity, namely an exposure quantity, added to form a picture density and a produced picture density in the case of a color film original is a linear or a curve akin to a linear. In other cases except for the above, which are normal conditions as previously described, the tonal conversion technique of this invention has limitation in its effectivity.

(2) The tonal converting process of a picture conducted by using the tonal conversion formula (2) is not incorporated a technical construction such that a density characteristic curve (hereinafter called as an individual density characteristic curve) of an original brought into a plate-making manufacturer, etc. is adjusted to a density characteristic curve (hereinafter called as a standard density characteristic curve) which becomes a basis for producing a printed picture with a desired picture quality, then a tonal conversion is conducted according to the adjusted density information.

The tonal conversion technique conducted by using the tonal conversion formula (2) lacks recognition about details of picture quality, more specifically the type of a density characteristic curve (an individual density characteristic curve) pertaining to an original, and further lacks means for rationally establishing the density characteristic curve. In production of a printed picture, normal condition is that originals with variety of picture quality, namely originals with variety of density characteristic curves are brought into for producing printed pictures. It is therefore an extremely important subject to be compensated, left behind by the tonal conversion technique conducted by using the tonal conversion formula (2).

For solving the problems, the present inventors have given an attention to the fact that there exists only one density characteristic curve of a photosensitive material under a constant developing process condition in the case of the original picture is a color film original. It is well known in the field of art that the developing condition is constant and stable. Incidentally, the density characteristic curve is a correlation curve expressed by an exposure quantity and a photosensitive density, hereinafter called as a basic density characteristic curve. The individual density characteristic curve of a given original picture may be set by assigning two density values of the highlight and shadow areas of the original picture on the basic density characteristic curve of a photosensitive material. Setting of a density characteristic curve in such a manner may be employed to original pictures upon production of another reproduced pictures, i.e., hard pictures such as electrostatic pictures, laser copy pictures, ink jet pictures, etc. and soft pictures. It is sufficient to adopt a basic density characteristic curve provided by the photographic photosensitive material manufacturer as technical information to users, which includes a density value (H) of the highlight area and a density value (S) of the shadow area which give the basis upon producing a printed picture from a color film original. As an example of the basic density characteristic curve, one shown in FIG. 1 has been adopted in preferred embodiment of this invention, details of which will be hereinafter described. Any picture information relating to the basic density characteristic curve may be adopted careless about the type of the reproduced picture, hard or soft.

Data of the individual density characteristic curve including the density values of the highlight and shadow areas of a color film original is not limited to information of the basic density characteristic curve of a photosensitive material provided by the manufacturer. Any technical information may be adopted as the individual density characteristic curve so long as it is rationally established, irrespective of the type of the reproduced picture, hard or soft.

To begin with, the individual density characteristic curve has to be adjusted to the density characteristic curve, e.g., a standard density characteristic curve, which becomes a basis for providing a reproduced picture with a desired and appropriate picture quality upon practicing the tonal conversion formula (1) of this invention.

Definition of the standard density characteristic curve will next be described.

Figure 2:
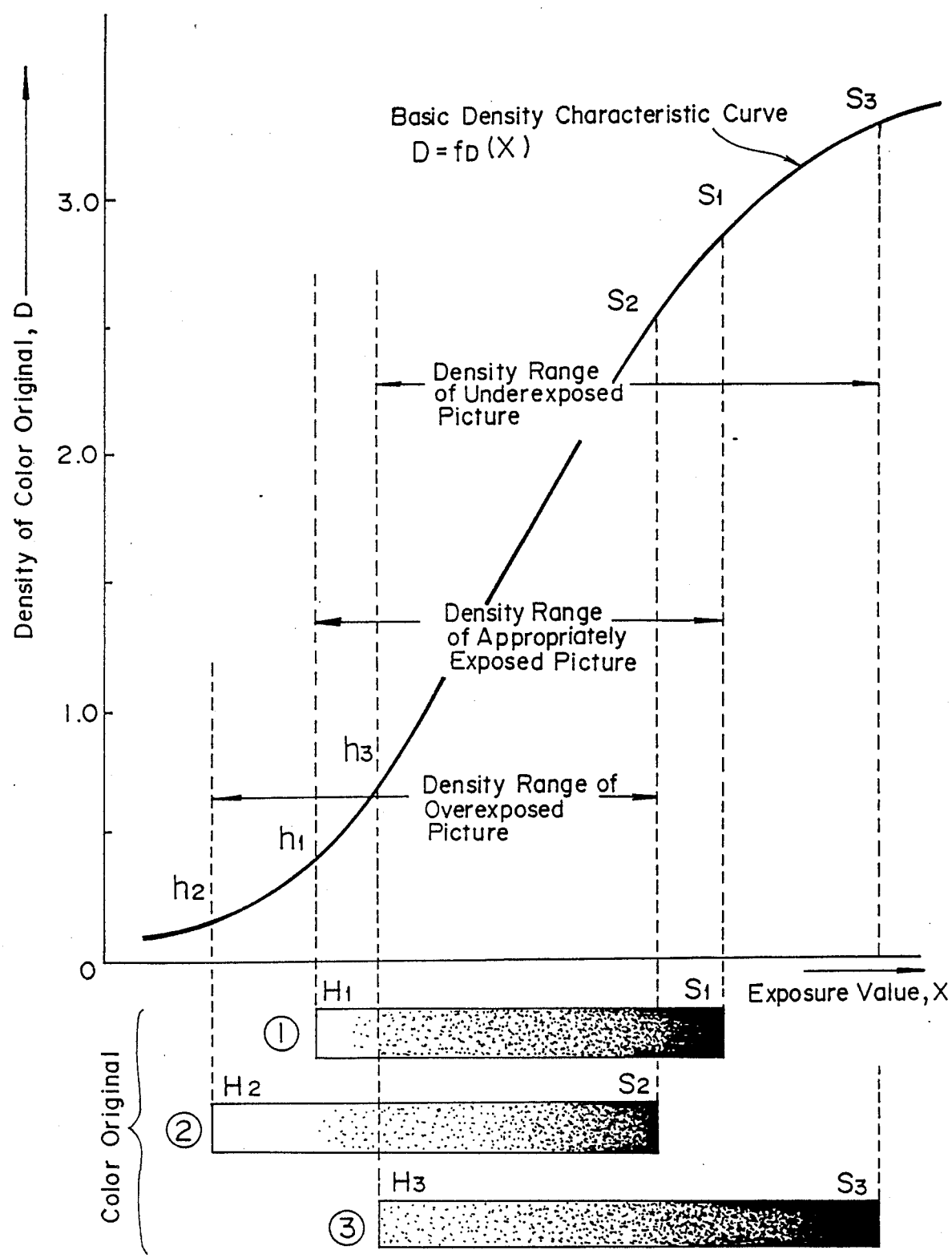
FIG. 2 is a diagrammatic illustration of a density range of a color original photographed under various exposure conditions, set on the basic density characteristic curve.

The standard density characteristic curve becomes in general a basis for constantly and stably providing a reproduced picture with a desired picture quality in a picture processing technique. The standard density characteristic curve is to define a predetermined range on the basic density characteristic curve. In this case, it is needless to say that the standard density characteristic curve has a different range on the basic density characteristic curve from that of the individual density characteristic curve. It is shown in FIG. 2, about which description will be made later.

It is not essential in the present invention that the standard density characteristic curve is set on the basic density characteristic curve. Another density characteristic curve may be adopted so long as a condition for providing a reproduced picture with a desired picture quality is maintained.

Namely, the standard density characteristic curve may of course be defined in a predetermined range on the basic density characteristic curve. It may also take another shape such as a curve akin to a linear or a curve having both linear and curved portions. More specifically, the density characteristic curve of a color film original with a standard picture quality may be adopted as a standard density characteristic curve, which is an ordinary technique in the art. The shape or number of the curve in the standard density characteristic curve may freely set in consideration of tastes of users, characteristics of scanners, conversion percentages of halftone dots from films into plate materials, dot gains in printing, characteristics of pictures, purposes of use, etc.

A method for adjusting both of said density characteristic curves will be described next.

If both of said curves, i.e., the individual density characteristic curve and the standard density characteristic curve, may be rewritten into functions, the individual density characteristic curve may be adjusted to the standard density characteristic curve by a mathematical process. Two ways can be considered in the adjustment. One is that both of said curves are completely matched. The other is that the curves are not completely matched, description of which will be hereinafter described. In the case that the the individual density characteristic curve is matched to the standard density characteristic curve, for example the standard density characteristic curve and the individual density characteristic curve including density values ($H_o$, $H_n$) of the highlight areas and density values ($S_o$, $S_n$) of the shadow areas respectively are set on the basic density characteristic curve, it is only necessary to conduct a mathematical process or a picture process based on a mathematical process for matching and adjusting the both curves since the basic density characteristic curve is determined by a function as previously described. Tonal conversion of a picture is therefore rationally carried out. There being a plurality of method and means for the mathematical process, the most economical and convenient one can be selected among them. Incidentally, as the construction, means, method for adjusting the individual density characteristic curve to the standard density characteristic curve, any adjusting method such as an electronic engineering processing method, a table reference method, a mechanical conversion process by a converter may be employed as well as the mathematical process.

In such a manner, a reproduced picture with a desired picture quality may be obtained constantly and certainly from any original irrespective of the picture quality, standard or non-standard, of the original by making the $\gamma$ value in the tonal conversion formula (1) a constant so long as the standard density characteristic curve which satisfies conditions for producing a reproduced picture (a printed picture) with desired picture quality is set along with obtaining the individual density characteristic curve, when the curves are combined by a rational method such as a mathematical process. It is natural that $\gamma$ value can be made a constant from the fact that an excellent result is given by using a predetermined value, for example a value from 0.9 to 1.0, in the tonal conversion of an original picture with a standard quality according to the tonal conversion formula (1) of this invention. Feasibility of making the $\gamma$ value a constant has an important meaning. It means that most of the terms in the tonal conversion formula (1) become constants, and computation of the formula (1) and system therefor may be simplified. As previously described, when one freely wants to change the picture quality of a printed picture, there should be assured freedom in condition of the tonal conversion formula (1) so that the $\gamma$ value may be set to a predetermined value. Features of the tonal conversion formula (1) in its practice and application will be described next.

Upon using the formula (1) derived in this invention, any density information datum can be used so long as it reflects a physical value pertaining to the density of each picture element of an original picture, which as described above is not necessarily limited to a color picture original upon production of a printed picture. The term "density information datum" should therefore be interpreted in a broadest sense. Synonyms may include reflected density, transmitted density, luminance, intensity, light quantity, amplitude, current value, voltage value, etc. It is only necessary to obtain such density information data as density information signals, for example, by scanning the original picture photoelectrically.

Incidentally, when a value measured by a densitometer (for example, a density of 0.3-2.80 in the case of a portrait on a positive color film) is used as the base density information standard datum $[(D_o-D_o)]$ and percentages (for example, values such as 5% or 95%) are used as $y_H$ and $y_S$, the halftone intensity (y) is calculated in terms of percentage.

Upon application of the formula (1) in accordance with this invention, it is free to use the formula (1) by modifying it as desired, to say nothing of its deformation, modification, induction, etc.

$$y = y_H + E[1 - 10^{-k \cdot (D_o - H_o)}](y_S - y_H)$$

where $$E = \frac{1}{1-\beta} = \frac{1}{1-10^{-\gamma}}$$

In the above modification given by way of example, $\alpha$ is assumed to be 1 ($\alpha=1$). This means that the surface reflectance, for example, of a printing paper (base material) to be used to express or visualize the picture to be printed is set at 100%. As the value of $\alpha$, any desired value may be chosen. From the practical viewpoint, it may be set at 1.0. This also applies to luminance pictures such as video pictures.

According to the above exemplary modification ($\alpha=1.0$), $y_H$ and $y_S$ can be set respectively for the highlight H and the shadow S areas on the printed picture as intended, which is a noticeable feature of this invention. This is evident from the fact that $(D_o-H_o)$ becomes 0 in the highlight H area by definition since $D_o$ becomes $H_o$ and $(D_o-H_o)$ becomes $(S_o-H_o)$=(standard picture density range)=$(S_o-H_o)$ since $D_o$ becomes $S_o$, namely, $$k \cdot (D_o - H_o) = \gamma \cdot \frac{[\text{standard picture density range}]}{[\text{standard picture density range}]} = \gamma$$

hence, $$-k \cdot (D_o - H_o) = -\gamma.$$

It is extremely important to users in consideration of a result of the work that previously arranged $y_H$ and $y_S$ may be constantly set on a printed picture upon using the tonal conversion formula (1) of this invention. For example, when $y_H$ and $y_S$ in a printed picture are set at desired values and the value $\gamma$ is changed (assume $\alpha=1.0$), the standard work characteristic curves for multicolor plate-making work, namely the color-separation characteristic curves (which may also be called "halftone characteristic curves), are obtained. The printed picture obtained in accordance with these color-separation characteristic curves may be readily evaluated in relation with the $\gamma$ value.

The tonal conversion method of this invention for pictures, which relies upon the tonal conversion formula (1), is extremely useful for the reproduction of the gradation and tone of an original picture, namely, for reproducing the picture quality of the original picture at the ratio of 1:1 in a picture to be reproduced. It is to be noted that its usefulness is not limited to such an application. In addition to the high-fidelity reproduction of the picture quality of an original picture, the formula (1) derived in the present invention is also extremely useful and flexible for the rational tonal change or modification of the picture quality of an original picture and by suitably selecting the values $\alpha$, $\beta$, $\kappa$, $\gamma$, $y_H$ and $y_S$. In this invention, the term "tonal conversion of a picture" should be interpreted in such a broad sense.

Upon application of "the present conversion technique" a user (worker) should keep in mind that "the present conversion technique" has the following freedom.

FREEDOM 1

The conversion formula (1) can be used to obtain a printed picture conforming its corresponding original picture very well. Namely, the tonal conversion formula (1) can be applied while giving the priority to the provision of a printed picture which looks exactly the same as the original picture to the eyes of a man. Such a manner of tonal conversion of a picture is described by the term "tonal conversion (of a picture)" in this invention.

FREEDOM 2

The conversion formula (1) can be used to change or modify an original picture to obtain printed pictures in light of needs from the viewpoint of photomechanical plate-making and printing techniques, artistic demands, orderers' need, etc., whereby printed pictures can be obtained. Namely, the tonal conversion formula (1) can be applied while giving the priority to the provision of a visual picture in a form changed (or modified) when observed through the eyes of a man. Such a manner of tonal conversion of a picture is described by terms "tonal change (modification) (of a picture)" in this invention.

The tonal conversion formula (1) of this invention has been described specifically in relation with production of printed picture. The application field of the present invention is however not limited to the printing field.

The tonal conversion formula (1) can be applied effectively to the following case.

(i) When it is desired to show a gradation or tone by changing the size of each dot as seen in printed pictures as described above in detail, such as letterpress, lithography, halftone gravure and silk screen pictures (this method is called "variable-area gradation method").

The tonal conversion method of this invention can also be applied effectively to the following cases.

(ii) When it is desired to show a gradation or tone by changing the intensity of a pigment or dye (coloring material), like a printing ink, to be caused to adhere per picture element (for example, per dot), which has a uniform area, as seen in fusion-transfer type thermal transfer pictures, (silver-salt utilized) thermally-developed transfer pictures and conventional gravure pictures (this method is called "variable-density gradation method").

(iii) When it is desired to show a gradation by changing the recording density per unit area, for example, the number of dots, the number and/or size of ink droplets, or the like as seen in pictures produced by a digital copying machine (color copies, etc.), printer (ink-jet type, bubble-jet type, or the like) or facsimile [this method is similar to the variable-area gradation method (i)].

(iv) When it is desired to obtain a CRT picture from video signals, TV signals or high-definition TV signals by adjusting the level of luminance of each unit picture element, or to obtain a halftone print or hard copy from the CRT picture.

(v) In addition to the tonal conversion of an original picture into a reproduced picture in substantially the same density (luminance and illuminance) range, when photographing is conducted in a range invisible from the standpoint of space, luminance, wavelength or time, for example, when pictorial information is inputted and converted in a low illuminance range where there is a large difference in density range between an original picture and a reproduced picture because of an extremely low contrast of the original picture (photographing by a high-sensitivity camera, or the like)—(in such a case, an emphasis is placed on the exaggeration conversion of the contrast of the picture rather than the tonal conversion of the picture).

(vi) When a diagnostic X-ray picture of poor quality is subjected to tonal conversion to achieve a correct diagnosis or to avoid any false diagnosis (this is not limited to X-ray pictures but applies to all diagnostic pictures in general).

(vii) Besides, the tonal conversion method of this invention can be applied to densitometers equipped with a density and tone conversion system to display a tone area percent and the like along with a density, printing-related equipment such as simulators for advance testing of color separation (for example, color proofing simulators) and simulators for the education of color separation, etc.

Upon application of the tonal conversion method of this invention, which uses the tonal conversion formula (1), in the various application fields described above, it is only necessary to subject pictorial information and/or electrical pictorial information signals, which may be either analog or digital signals, relating to the density obtained from an original continuous-tone picture (including a hard original and a soft original) to tonal conversion at a picture processing unit (tonal conversion unit) of an equipment in each of the various application fields described above, and then to control the current or voltage level in the recording portion (recording head) of the equipment or the impression time or the like in accordance with the thus-processed value, i.e., y value (tonal intensity) to change the number of dots per unit area (per picture element), the density per given area (for example, 1 dot) or the like, thereby making it possible to output a reproduced halftone or like picture having a density gradation corresponding to the original picture at the ratio of 1:1.

For example, to make an original plate for a printed picture which is a halftone picture, namely, an original printing plate by using the tonal conversion method of this invention which is based on the tonal conversion formula (1), it is only necessary to use a conventional system known well in the present field of art. The above plate-making work can be achieved by incorporating a software, which can perform the tonal conversion method of this invention, in a commercial color-separation and halftone scanning system such as an electronic color separation apparatus (color scanner or tonal scanner) to practise.

The photomechanical plate-making process is conducted in the following steps:

(i) indication highlight area (H) and shadow area (S) on an original color picture as desired and mounting the original color picture on an original drum of a color scanner;

(ii) setting an original-scanning head of the color scanner at the H area and S area on the original color picture and measuring, through color-separating red (R), green (G) and blue (B) filters, the densities of the H area and S area and densities between the H area and S area;

(iii) defining a density characteristic curve of the original color picture on a density characteristic curve of the original color film on the basis of the density data of the H area and S area measured through the respective filters and then adjusting the density values between the H area and S area on the density characteristic curve of the original color film or by means of a standard density characteristic curve set as desired;

(iv) indicating a desired dot percent for each of H and S areas of each of cyan (C), magenta (M) and yellow (Y) plates, and then converting the density value at a desired point on an original continuous-tone color picture of each plate into a dot percent of a dot at the corresponding point on the halftone picture by using the thus-indicated dot percent, the density values measured through the respective filters or the density values adjusted in the above step (iii) and the below-described tonal conversion formula (1) (dot percents indicated respectively for the H and s areas of the C plate are combine with the density value of the R filter. Similarly, the M plate and G filter are combined, and the Y plate and B filter.); and (v) preparing the individual plates by using the dot percents, which have been obtained above for the respective plates, for the control of exposure for the formation of halftone pictures on the respective plates.

Described more specifically, as the conventional system, may be mentioned a system for making an original printing plate by exposing an original picture, which is a continuous-tone picture such as a color photograph, to a spot light of a small diameter, receiving at a photoelectric conversion unit (photomultiplier) light (a pictorial information signal) reflected by or transmitted through the original picture, processing the thus-obtained electrical signal (electrical value) of pictorial information by a computer as needed, controlling an exposing light source based on a processed electrical signal (voltage) of pictorial information outputted from the computer, and then exposing a blank film to a laser spot light. It is thus only necessary to incorporate a software capable of converting electrical signals of continuous-tone pictorial information into electrical signals of halftone pictorial information by using the formula (1) of this invention, for example, in a computerized processing unit of the above system, said unit being adapted to process electrical signals of pictorial information of the original picture. The individual density characteristic curve of an original picture is adjusted to a standard density characteristic curve by means of such a software. The software may take any one of various forms such as a general purpose computer storing an algorithm of the formula (1) derived in this invention as a software and having an I/F (interface) for A/D (analog-digital conversion) and D/A, an electric circuit embodying the algorithm as a logic by a general purpose IC, an electric circuit with a ROM containing results computed in accordance with the algorithm, a PAL, gate array or custom IC with the algorithm embodied as an internal logic, etc. Reflecting the recent development of modularization in particular, a computing system capable of adjusting an individual density characteristic curve to a standard density characteristic curve and performing tonal conversion of a picture in its density range on the basis of the formula (1) derived in this invention can be easily fabricated as a module of a special-purpose IC, LSI, microporcesor, microcomputer or the like. An original printing plate of a halftone gradation having the dot area percent (value y) derived by the formula (1) can be easily made by causing a photoelectrically-scanning spot light to advance successively as discrete spots and operating a laser exposing unit in unison with the scanning.

The tonal conversion of this invention in the density range of a picture is usually performed in the course of conversion of inputs. It can however be performed in any stage such as conversion of outputs, recording, transmission, processing or display.

ADVANTAGES OF THE INVENTION

The present invention has improved a conventional tonal conversion technique of a picture in a density range of a picture in the first step of processing of pictures and brought up it to a scientific and rational technique which allows constant and stable provision of a reproduced picture with a desired picture quality, thereby bringing about the following advantages:

(1) Conventional techniques for the tonal conversion of a picture, said techniques being dependent on experiences and perception of man and having been responsible for the instability and confusion in the production technology and product quality, namely, techniques for the conversion of the gradation and tone of a picture and those for their change, modification, adjustment and control can be replaced by scientific and rational techniques respectively.

(2) It has become possible to standardize tonal conversion techniques for a picture, namely, all techniques such as conversion of the gradation and tone of a picture and their change, modification, adjustment and control.

This invention has therefore brought about significant contributions to the improvements and stabilization of techniques, productivity, costs and quality. Described specifically, the following contributions may be mentioned:

(i) Scanners and simulators can be simplified in system, thereby making it possible to reduce their manufacturing costs.

Currently-available scanners require as essential components a computation system for enciphering color-separation characteristic curves and halftone characteristic curves determined based on the experiences and perception of man—such as an electronic computer—and a memory for these characteristic curves. The present invention permits omission or simplification of such computation system and memory.

(ii) This invention has made it unnecessary to determine color-separation characteristic curves and halftone characteristic curves themselves, the determination of which has heretofore been an essential operation in a plate-making process for the formation of a picture to be printed, requires substantial time and labor and is hence cumbersome and costly.

(iii) This invention has also made it unnecessary to perform proofing work which is generally considered essential for any process available presently for the formation of a picture to be printed.

In addition, high-quality products can be obtained stably without using an image-forming simulator which is now considered indispensable or convenient.

(iv) Upon formation of printed pictures, the present invention has made it possible to always provide good products stably by the same procedure within the same working time irrespective whether an original picture has standard or non-standard quality.

Owing to this advantage, the plate-making time can be shortened significantly and the materials can also be saved. Redoing which reaches as high as 30–40% in conventional techniques can be reduced at least to 5%, thereby bringing about a considerable improvement to the efficiency of plate-making work.

(v) This invention allows to stably obtain pictures, such as printed pictures, having picture quality, i.e., gradation and tone which can always be felt appropriate and natural by the visual sensation of man.

(3) The training and education of all processing techniques for pictures can be improved into scientific and rational ones.

(4) In all processing techniques for pictures, routine work such as conversion, modification, adjustment and control of the characteristics, gradation and contrast of each picture can be performed rationally and scientifically in a standardized manner as designed.

(5) When photographing a picture in such a low illuminance range that generally results in a low-constrast picture, it has been necessary to set the shutter speed slower to obtain more photons for a high contrast. This invention has however eliminated this limitation, so that a vivid picture can be obtained irrespective of the moving speed of an object even in such a low illuminance range.

(6) In the architecture of an IC, LSI or the like for the process of pictorial information, the design of an computing circuit for the pictorial information can be simplified rationally and its function can also be improved with ease.

In tonal conversion of a picture at least in its density range, the above advantage allows to design a simpler processing software for digital images or the like while improving the function. This facilitates the reduction of a software into a hardware and hence lowers the software cost significantly.

(7) In apparatus and systems using recognition and contrast of pictures, contrast of a required portion of a picture may be desirably adjusted, thereby greatly improving the function of the apparatus and systems and permitting reduction of their manufacturing costs.

(8) By adopting the technique of this invention in combination with equipment such as simulator, densitometer and the like for the processing of picture information, the function of the equipment can be improved whereby the importance and roles of these equipment in an image processing system can be rendered more consistent with the technical level of the overall system.

(9) All image processing equipment can be rationally simplified in both construction and system, so that their handling can be facilitated substantially.

EMBODIMENTS OF THE INVENTION

This invention will hereinafter be described in more detail on the basis of certain examples. It should however be borne in mind that the present invention is not limited to or by the following examples so long as the essential features thereof are not departed.

EXAMPLE 1

As one embodiment of this invention, a description will be made on tonal conversion of a picture in the course of formation of a picture to be printed, i.e., color-separation by a scanner, which is a representative example bearing the most complicated problem in the course of picture processing, for the sake of inspecting the effectivity of this invention.

(i) First of all, both of an individual density characteristic curve of an original picture (a color film original, hereinafter called as a color original) and a standard density characteristic curve, which becomes a basis to obtain a printed picture with a desired picture quality, were obtained from a basic density characteristic curve, which is reported in color film technical materials provided to the public by the manufacturer of the color film. The basic density characteristic curve is shown in FIG. 1, where the ordinate axis represents density of the color original (D) and the obscissas axis represents exposure value (X).

A function $F_D(X)$ to obtain X→D and a function $F_X(D)$ to obtain X→D, which is an inverse function of $F_o(X)$, both are derived from the basic density characteristic curve shown in FIG. 1. Obtained values are shown in Table 1. By the way, the most suitable functions were obtained in each definition range of X or D respectively, to provide the basic density characteristic curve as faithful as possible.

TABLE 1

| Functional Representation of a Basic Density Characteristic Curve | | |
|---|---|---|
| Formula | | Definition range |
| $f_D(x)$ | $D = 10^x \times \frac{1}{10} \times 0.4576 + 0.0424$ | 0.00–1.00 Definition range of X value |
| | $D = 0.50 + 1.2821 (X - 1.00)$ | 1.00–1.39 |
| | $D = 1.00 + 1.6129 (X - 1.39)$ | 1.39–1.70 |
| | $D = 1.50 + 2.2727 (X - 1.70)$ | 1.70–a1.92 |
| | $D = 2.00 + 2.3810 (X - 1.92)$ | 1.92–2.13 |
| | $D = 2.50 + 2.0000 (X - 2.13)$ | 2.13–2.28 |
| | $D = 2.80 + 1.2500 (X - 2.28)$ | 2.28–2.40 |
| | $D = 0.3975 \log \{\ln(X - 1.3) \times 100\} + 2.5608$ | 2.40–2.80 |
| $f_x(D)$ | $X = \log\{(D - 0.00424) \div 0.04576$ | 0.10–0.50 Definition range of D value |
| | $X = 1.00 + 0.78 (D - 0.5)$ | 0.05–1.00 |
| | $X = 1.39 + 0.62 (D - 1.00)$ | 1.00–1.50 |
| | $X = 1.70 + 0.44 (D - 1.50)$ | 1.50–2.00 |
| | $X = 1.92 + 0.42 (D - 2.00)$ | 2.00–2.50 |
| | $X = 2.13 + 0.5000 (D - 2.50)$ | 2.50–2.80 |
| | $X = 2.25 + 0.8 (D - 2.80)$ | 2.80–2.95 |
| | $(D - 2.5608) \div 0.3975$ $(1/100) \times 10$ | |
| | $x = 1.3 + e$ | 2.95–3.20 |

(ii) To specify an individual density characteristic curve, density values $D_{Hn}$ of H area and $D_{Sn}$ of the S area of the color original picture (hereinafter, index of n is used to represent the value of the individual density characteristic curve) and predetermined values of $D_{Ho}$ (for example, density value 0.20) and $D_{So}$ (for example, density value 2.80) which are to specifying a standard density characteristic curve (hereinafter, index of o is used to represent the value of the standard density characteristic curve) were plotted on the individual density curve. They are shown in FIGS. 2 and 3.

(iii) Adjustment of the individual density characteristic curve and the standard density characteristic curve:

In this example, the individual density characteristic curve was adjusted to the standard density characteristic curve by a mathematical process.

Figure 3:
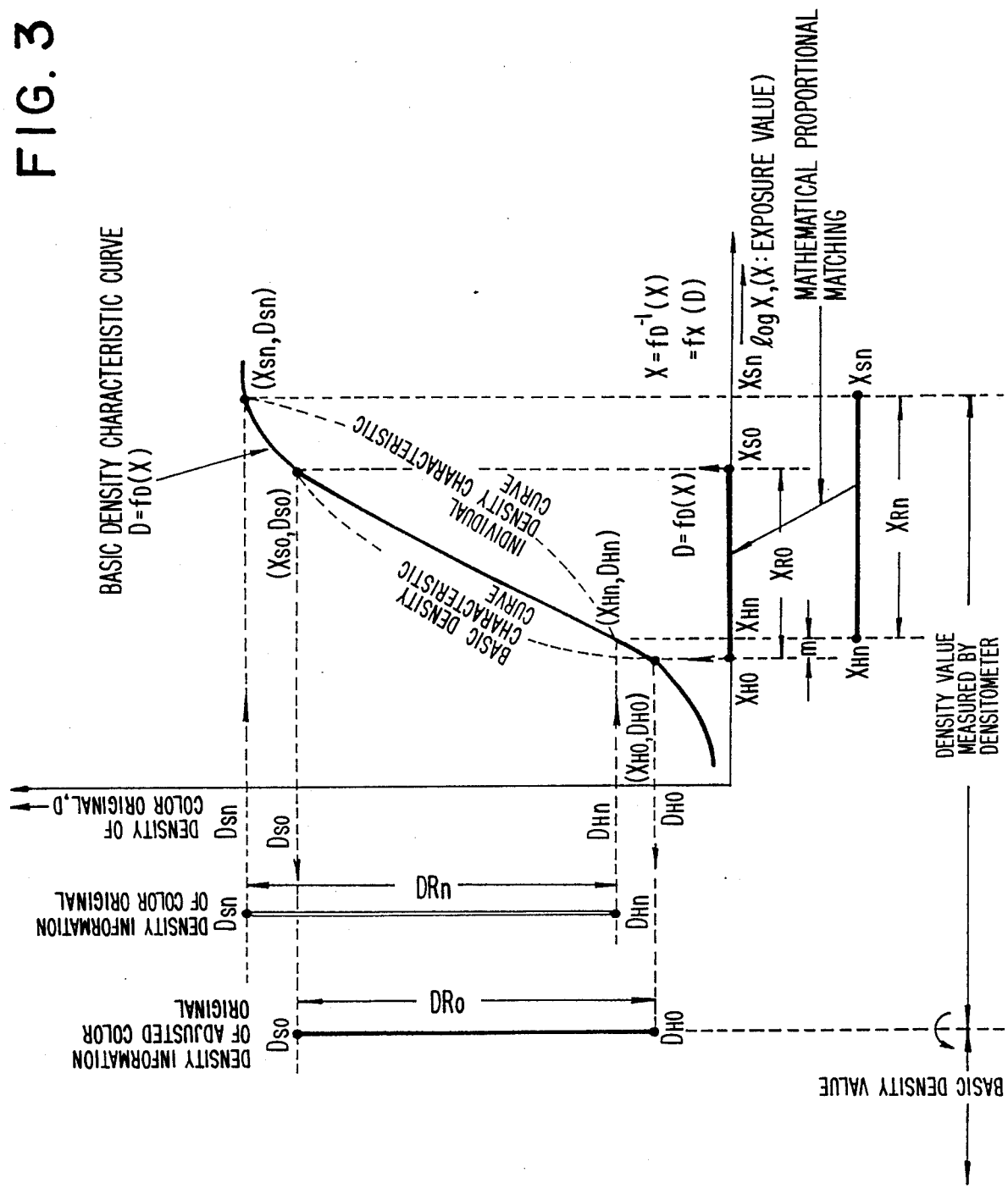
FIG. 3 is a schematic illustration of a principle for matching an individual density characteristic curve with the standard density characteristic curve.

An example of the adjustment is shown in FIG. 3, of which steps are carried out as follows:

(1) The individual density characteristic curve having a density range from $D_{Hn}$ to $D_{Sn}$ includes $X_{Rn}$ ranged from $X_{Hn}$ to $X_{Sn}$ as an exposure value range. A desired density information value $D_n$ on the individual density characteristic curve is first substituted for the function $f_{x(D)}$, thereby obtaining a $X_n$ value in $X_{Rn}$.

(2) On the other hand, the standard density characteristic curve having a density range from $D_{Ho}$ to $D_{So}$ includes $X_{Ro}$ ranged from $X_{Ho}$ to $X_{So}$ as an exposure value range. The $X_n$ value previously obtained is adjusted to a corresponding $X_o$ value in $X_{Ro}$.

(3) The $X_o$ value such obtained is substituted for the function $f_{D(x)}$ to determine a $D_o$ value, thereby completing conversion from $D_n$ to $D_o$.

FIG. 3 shows an original picture photographed under an under-exposure condition, namely a picture having a relation of $X_{Ho} < X_{Hn}$. It is natural that one of over- three originals are all 2.60, the adjustment work were carried out in both of the ways, the simple adjustment and the proportional adjustment.

TABLE 2

| Matching data of individual density characteristic curve and standard density characteristic curve | | | | | | | | |
|---|---|---|---|---|---|---|---|---|
| | No.1 (under-exposure, low key) | | | | No.2 (over-exposure, high key) | | | |
| Original D · R | $DR_n = 3.20 - 0.60 = 2.60$ | | | | $DR_n = 2.70 - 0.10 = 2.60$ | | | |
| $XR_n$ | $XR_n = 2.80 - 1.80 = 1.72$ | | | | $XR_n = 2.24 - 0.10 = 2.14$ | | | |
| $XR_o/XR_n$ | $XR_o/XR_n = 1.76/1.72 = 1.0233$ | | | | $XR_o/XR_n = 1.76/2.14 = 0.8224$ | | | |
| $\|m\|$ | 0.54 | | | | 0.44 | | | |
| Density characteristic curve | Individual | | After adjustment | | Individual | | After adjustment | | |
| Experimental data | $D_n$ | $X_n$ | $X_0$ | $D_0$ | $D_n$ | $X_n$ | $X_0$ | $D_0$ | Remarks |
| | 0.60 | 1.08 | 0.54 | 0.20 | 0.10 | 0.10 | 0.54 | 0.20 | Standard |
| | 0.80 | 1.23 | 0.69 | 0.27 | 0.30 | 0.75 | 1.07 | 0.59 | density |
| | 1.00 | 1.39 | 0.85 | 0.37 | 0.50 | 1.00 | 1.28 | 0.86 | character- |
| | 1.20 | 1.51 | 0.97 | 0.47 | 0.70 | 1.16 | 1.41 | 1.03 | istic |
| | 1.40 | 1.64 | 1.10 | 0.63 | 0.90 | 1.31 | 1.54 | 1.24 | curve |
| | 1.60 | 1.74 | 1.20 | 0.76 | 1.10 | 1.45 | 1.65 | 1.42 | |
| | 1.80 | 1.83 | 1.29 | 0.87 | 1.30 | 1.58 | 1.84 | 1.82 | |
| | 2.00 | 1.92 | 1.38 | 0.99 | 1.50 | 1.70 | 1.86 | 1.86 | $D_{H0} = 0.20$ |
| | 2.20 | 2.00 | 1.46 | 1.11 | 1.70 | 1.79 | 1.93 | 2.20 | $D_{S0} = 2.80$ |
| | 2.40 | 2.09 | 1.55 | 1.26 | 1.90 | 1.88 | 2.00 | 2.19 | $DR_0 = 2.60$ |
| | 2.60 | 2.19 | 1.65 | 1.42 | 2.10 | 1.96 | 2.07 | 2.33 | $X_{H0} = 0.54$ |
| | 2.80 | 2.30 | 1.76 | 1.64 | 2.30 | 2.05 | 2.14 | 2.52 | $X_{S0} = 2.30$ |
| | 3.00 | 2.44 | 1.90 | 1.95 | 2.50 | 2.13 | 2.21 | 2.64 | $XR_0 = 1.76$ |
| | 3.20 | 2.80 | 2.26 | 2.76 | 2.70 | 2.24 | 2.30 | 2.80 | |
| | Simple matching | | | | Proportional matching | | | | | exposed has an inverse relationship between $X_{Ho}$ and $X_{Hn}$.

The following points should be noted upon adjustment, as shown in FIG. 3. It is a normal state that $XR_o$ (an exposure value range of an original having a standard picture quality) and $XR_n$ (an exposure range of an individual original with a non-standard picture quality) are not consistent with each other. In this case, there are two ways to adjust them, i.e., simple matching where values of the highlight area density of both pictures are matched while matching in the shadow areas is ignored, and proportional matching where values in the highlight and shadow areas of the pictures are matched. In this example, the individual density characteristic curve is matched to the standard density characteristic curve by adopting both of the ways.

Formulae having been used in the matching work are as follows:

The case of simple matching: $X_o = f_x(D_n) \pm |m|$,

The case of proportional matching:

$$X_o = f_x(D_{Ho}) + \left[ \{f_x(D_n) \pm |m|\} - f_x(D_{HO}) \times \frac{XR_o}{XR_n} \right]$$

where
m: requisite quantity for parallel shift
$|m| = |X_{Hn} - X_{Ho}|$;
$XR_o$: an exposure value range of an original with standard picture quality on the ordinate axis; and
$XR_n$: an exposure value range of an individual original picture with non-standard picture quality on the ordinate axis.

(iv) Actual matching:

As actual matching examples, three typical cases were adopted, e.g., color originals with a standard picture quality ($D_{Hn} = 0.29$, $D_{S\phi} = 2.80$), a high key picture quality ($D_{Hn} = 0.10$, $D_{Sn} = 2.70$), and a low key picture quality ($D_{Hn} = 0.60$, $D_{Sn} = 3.20$). Results of the experiment are shown in Table 2. As the density ranges of said three originals are all 2.60, the adjustment work were carried out in both of the ways, the simple adjustment and the proportional adjustment.

Figure 4A:
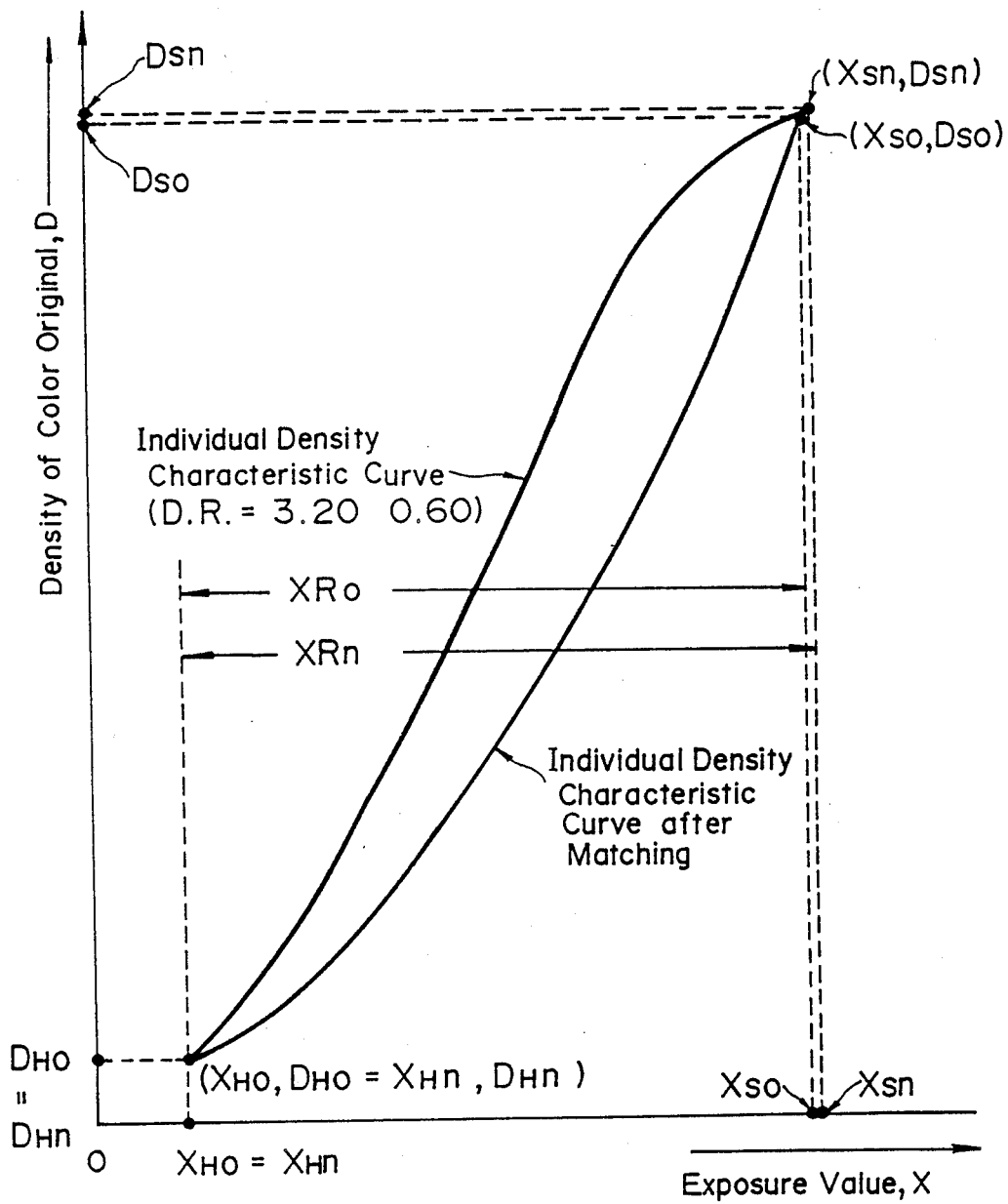
FIG. 4(a) is a diagrammatic illustration showing an example in which the individual density characteristic curve is matched with the standard density characteristic curve according to a simple matching.

The result of the experiment corroborated that by adjusting these individual density characteristic curves to the standard density characteristic curve, proof printed pictures may be obtained from any color original having a high key picture quality resulted from an excessive exposure quantity upon photographing or a low key resulted from a short exposure quantity. The resultant proof printed pictures have picture qualities equivalent to that of a proof printed picture obtained by color-separating its color original by a scanner, the color original having been photographed in a standard exposure quantity and thus having a standard picture quality. The above two density characteristic curves are shown in FIGS. 4(A) and 4(B) for comparing their shapes, where the highlight areas of the curves take the same point in each coordinate. From FIGS. 4(A) and 4(B), it is known that when the individual density characteristic curves are matched to the standard density characteristic curve, the density gradation, especially the density gradation in the highlight and shadow areas, are excellently corrected.

(v) Production of printed pictures:

Based on the above data, three typical color originals of standard picture quality, high key picture quality and low key picture quality were scanned via a personal computer "PC-9800" (trade name, manufactured by NEC Corp.) loaded with soft wares for matching the density characteristic curves and performing computation in accordance with the tonal conversion formula (1). Such obtained electric signals (picture information signals) were subjected to color-separation by "DC-360ER" (trade name) manufactured by HELL Corporation, which is incorporated a system for processing electric picture information signals, thereby obtaining a proof printed picture by way of Du Pont's Cromalin process. Evaluation were made on the resultant picture quality of the proof printed picture. Incidentally, in this work 1.0 were adopted as the $\gamma$ value.

The three proof printed picture mutually had the same tone, namely same gradation and color tone, and were in well gray- and color-balanced. As a natural consequence, details of the picture quality of the proof printed pictures produced in the technique of this invention had rich and natural gradation in the highlight area of the color original in high key and shadow area of the other color original in low key.

EXAMPLE 2

Next, another experiment was conducted using an original having a standard picture quality, a color-fogged original with a high key picture quality (over-exposed), and another color-fogged original with a low key picture quality (under-exposed) for removing color-fog therefrom.

Three color originals were used in this experiment, one with a standard picture quality free from color fog ($D_{Ho}=0.20$, $D_{So}=2.80$), one color-fogged having a high key picture quality ($D_{Hn}=0.10$, $D_{Sn}=2.70$), and another color-fogged having a low key picture quality ($D_{Hn}=0.60$, $D_{Sn}=3.20$). The experiment was conducted in regard to whether proofing printed pictures which have a picture quality similar to that of a proof printed picture obtained by subjecting its color original with a standard picture quality free from color-fog to color-separation can be obtained from the latter two color originals sustaining color-fog.

In this example, "M-460" (trade name) manufactured by Crossfield as a color scanner and Du Pont's Chromalin process were used to form the proof printed pictures.

In this example, the same color film was used as in Example 1 to adjust each of the individual characteristic curves of the color-fogged color originals to the standard density characteristic curve, respectively. Also, the result derived from Example 1 was used because of the same density range.

Figure 5:
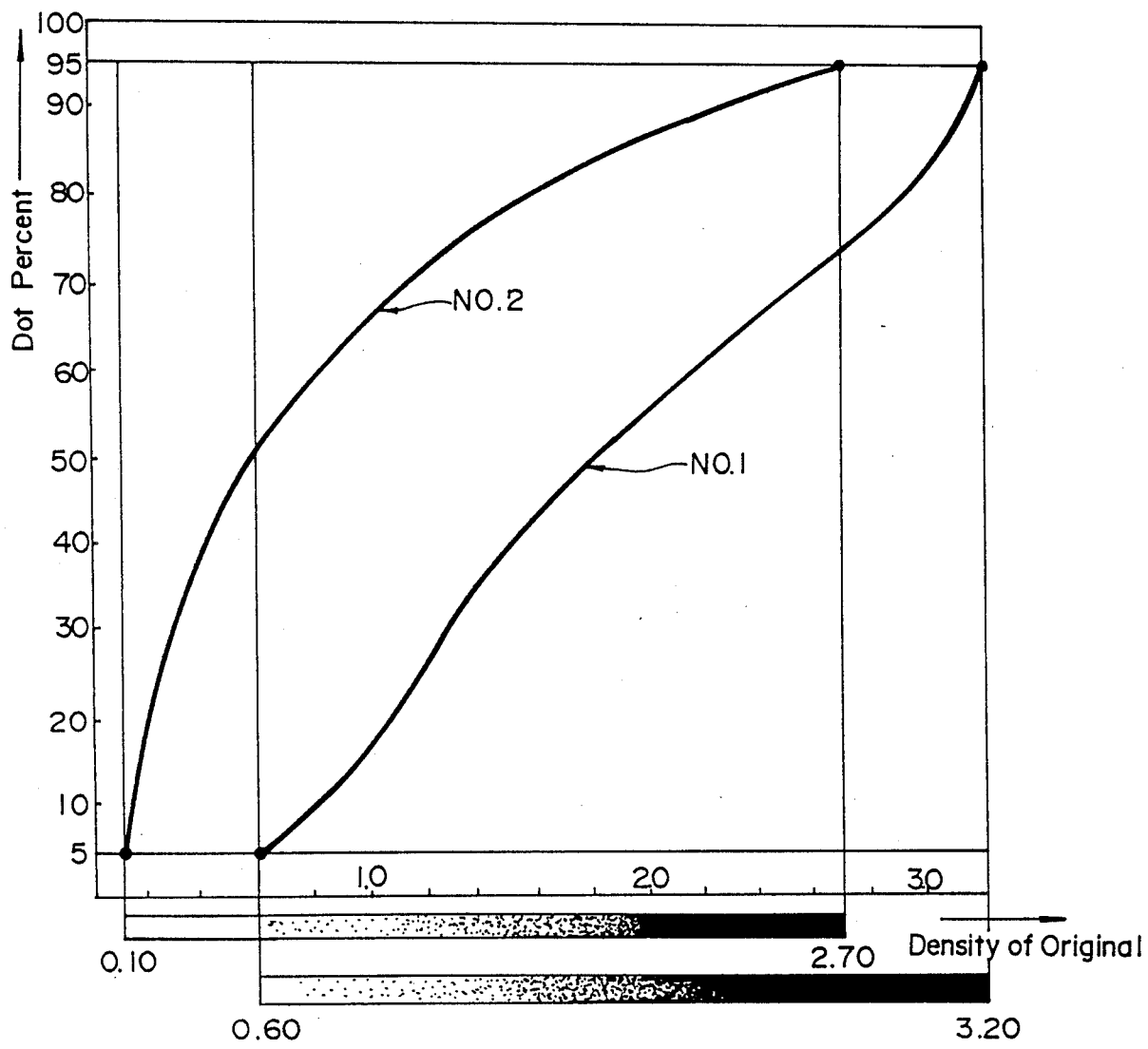
FIG. 5 is a diagrammatic illustration of a halftone gradation characteristic curve (a color-separation characteristic curve) set to originals with non-standard picture quality, original No. 1 being under-exposed while No. 2 being over-exposed.

Next, the y values were determined by applying the tonal conversion formula (1) on the bases of $D_o$ in the density values of $D_n$ and $D_o$ in Table 2. The results are shown in Table 3. The correlation between the y and $D_n$ values in Table 3 is shown in Table 5. Curves shown in FIG. 5 are so-called color-separation curves provided by a scanner, which establish a relationship between the density values of an adjusted color original and values of halftone dot area percentage on a proof printed picture corresponding thereto.

TABLE 3

| | Scanner separation curve setting data | | | | | |
|---|---|---|---|---|---|---|
| | No.1 (under-exposed, low key) | | | No.2 (over-exposed, high key) | | |
| Original density step | Individual $D_n$ | after adjustment $D_o$ | halftone % y (%) | Individual $D_n$ | after adjustment $D_o$ | halftone % y (%) |
| 1 | 0.60 | 0.20 | 5.00 | 0.10 | 0.20 | 5.00 |
| 2 | 0.80 | 0.27 | 11.24 | 0.30 | 0.58 | 33.92 |
| 3 | 1.00 | 0.37 | 19.48 | 0.50 | 0.83 | 47.98 |
| 4 | 1.20 | 0.47 | 26.30 | 0.70 | 1.00 | 55.80 |
| 5 | 1.40 | 0.63 | 37.08 | 0.90 | 1.21 | 64.07 |
| 6 | 1.60 | 0.76 | 44.74 | 1.10 | 1.37 | 69.35 |
| 7 | 1.80 | 0.87 | 50.05 | 1.30 | 1.57 | 75.35 |
| 8 | 2.00 | 0.99 | 55.66 | 1.50 | 1.80 | 80.79 |
| 9 | 2.20 | 1.11 | 60.94 | 1.70 | 1.95 | 83.72 |
| 10 | 2.40 | 1.26 | 66.63 | 1.90 | 2.12 | 86.97 |
| 11 | 2.60 | 1.42 | 71.58 | 2.10 | 2.26 | 88.86 |
| 12 | 2.80 | 1.64 | 77.71 | 2.30 | 2.45 | 91.32 |
| 13 | 3.00 | 1.95 | 84.30 | 2.50 | 2.54 | 92.41 |
| 14 | 3.20 | 2.76 | 95.00 | 2.70 | 2.80 | 95.00 |
| Matching method | Simple matching | | | Proportional matching | | |

Constants in the tonal conversion formula (1): $a = 1.00$, $\gamma = 0.90$, $y_H = 5\%$, and $y_S = 95\%$.

Upon setting a color-separation curve provided by a scanner, the $\alpha$ value was set to 1.00, the $\gamma$ value to 0.9, $y_H$ to 5%, and $y_S$ to 95% in the tonal conversion formula (1). The correlation of the halftone dot area percent values (y value) of each color plates, i.e., C, M and Y, followed the common way in the art, as shown in Table 4.

TABLE 4

An example showing correlation of halftone dot area percentages values of each color plate

| Color Plate | H | Medium Tone | S |
|---|---|---|---|
| C | 5.0 | 50.0 | 95.0 |
| M | 3.0 | 40.0 | 90.0 |
| Y | 3.0 | 40.0 | 90.0 |

Evaluation was made on picture qualities of proof printed pictures in halftone obtained via color-separation by a scanner. Examination was then made on the picture qualities of the proof printed pictures produced by the Chromaline process. The three proof printed pictures thus obtained have mutually almost same tone, namely same gradation and color tone, and are well gray- and color-balanced. Color-fog on the color originals in high key or low key are completely removed. As a natural consequence, details of picture quality of the proof printed pictures formed in the technique of this invention have rich and natural gradation in the highlight area of the color original in high key and the shadow area of the color original in low key.

The condition for removing color-fog may be considered from the result in Table 3.

It is realized from this example that color-fog on color originals is effectively removed by the present invention from this example. The present inventors considers the effect of color-fog removal in this example as follows. As well known, fog generates in such a case that quality of light used upon photographing an original differs from one designed by a manufacturer of the color film. In this case, color-fog generates all over a picture. The fog also generates in another case that a condition of developing a photographed color film differs from one set by the manufacturer. In this case, partial color-fog generates on a picture. Color-fog generates with not only one reason but also two or more reasons compounded together. The density characteristic curve of an original is affected by such color fog. For example, the density characteristic curve of an original is shifted parallel to an extent corresponding to a degree of the color-fog, or a gradient of the density characteristic curve is changed due to the color-fog. This invention permits to automatically remove the color-fog since technical means for adjusting the individual density characteristic curve of an original to the standard density characteristic curve for providing standard picture qualities to reproduced pictures is incorporated therein.

Conditions for removing color-fog may be assumed from the results shown in Table 3. Namely, looking at values of y and $D_o$ (both of high and low keys) after adjustment in Table 3 and comparing the data of two picture, substantially the same y values (halftone dot area percentage) are set to substantially the same adjusted density values in each of the pictures.

Even if the density ranges of the pictures much differs from each other, the above effect may be achieved by adjusting the individual density characteristic curves to the standard density characteristic curve, then conducting the tonal conversion formula (1) on the basis of the adjusted density values.

Such condition, considered to be essential, is satisfied only by employing the tonal conversion formula (1) of this invention.

We claim:

1. A method for producing a reproduced picture by tonal conversion of an original picture on the basis of pictorial information from the original picture, which comprises:
    (i) setting the density value ($H_n$) of the highlight area of the original picture, the density value ($S_n$) of the shadow area of the original picture and an individual density characteristic curve $fD_n$ (x) ranging from said $H_n$ to said $S_n$, where x indicates a physical value correlated to the densities (D) of the original picture and reproduced picture, such as exposure;
    (ii) setting the density value ($H_o$) of the highlight area and the density value ($S_o$) of the shadow area of a standard original picture, which can provide a reproduced picture having suitable picture quality for the visual feeling of men, as well as a standard density characteristic curve $fD_o$ (x) ranging from said $H_o$ to said $S_o$;
    (iii) adjusting the individual density characteristic curve $fD_n$ (x) to the standard density characteristic curve $fD_o$ (x) and further determining an adjusted density information value $D_\phi$ on the standard original picture corresponding to the density information value $D_n$ of a desired picture element on the original picture; and
    (iv) then conducting tonal conversion of the picture in said density range on the basis of the thus-obtained adjusted density information value $D_o$ on the standard original picture corresponding to the density information value $D_n$ of the desired picture element on the original picture by using the following tonal conversion formula:

$$y = y_H + \frac{\alpha[1 - 10^{-k \cdot (D_o - H_o)}]}{\alpha - \beta} \cdot (y_S - y_H)$$

where
  ($D_o - H_o$): the base density information datum obtained by subtracting the density value $H_\phi$ of the highlight area of the standard original picture from the adjusted density information value $D_o$ on the standard original picture corresponding to the density information value $D_n$ of the desired picture element on the original picture;
  y: the halftone density intensity on the reproduced picture, corresponding to the desired picture element on the original picture;
  $y_H$: a desired halftone density intensity set for the highlight area on the picture to be reproduced;
  $y_S$: a desired halftone density intensity set for the shadow area on the picture to be reproduced;
  $\alpha$: the surface reflectance of a base material on which the reproduced picture is to be shown;
  $\beta$: a value obtained from $\beta = 10^{-\gamma}$;
  $\kappa$: another value determined from $\gamma/(S_o - H_o)$; and
  $\gamma$: a desired optional factor.

2. The method as claimed in claim 1, wherein the pictorial information comprises electrical signals converted from density information which have been obtained by photoelectrically scanning the original picture.

3. The method as claimed in claim 1, wherein the halftone density intensities (y), ($y_H$) and ($y_S$) are each expressed in terms of dot area percentage.

4. The method as claimed in claim 1, wherein the reproduced picture is a printed picture.

5. The method as claimed in claim 1, wherein the visualizing medium is an ink.

6. The method as claimed in claim 1, wherein the base material is a paper sheet.

* * * * *